Aug. 26, 1941.   J. A. SCHMITT ET AL   2,254,093
PULSATOR
Original Filed March 22, 1937   3 Sheets-Sheet 1

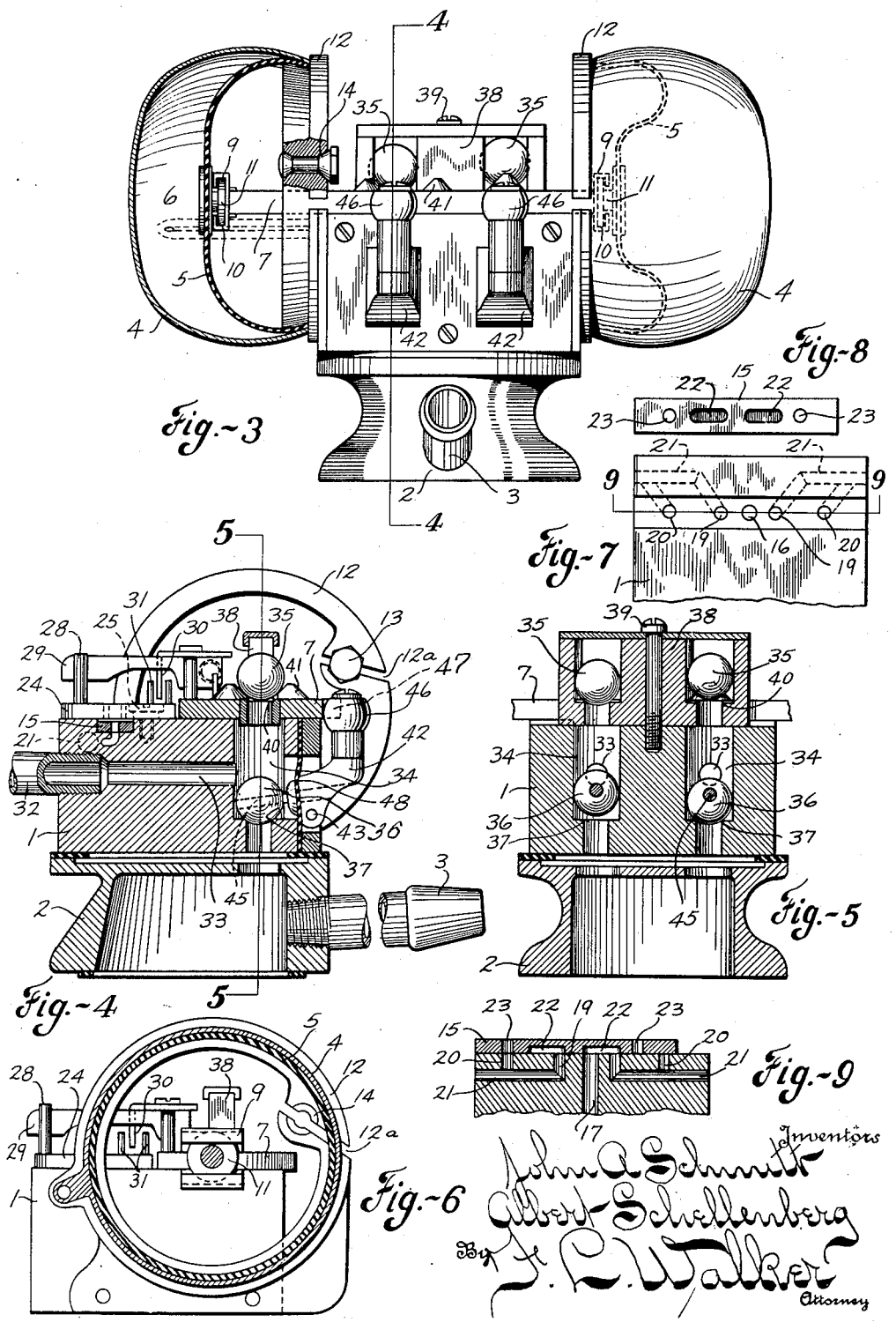

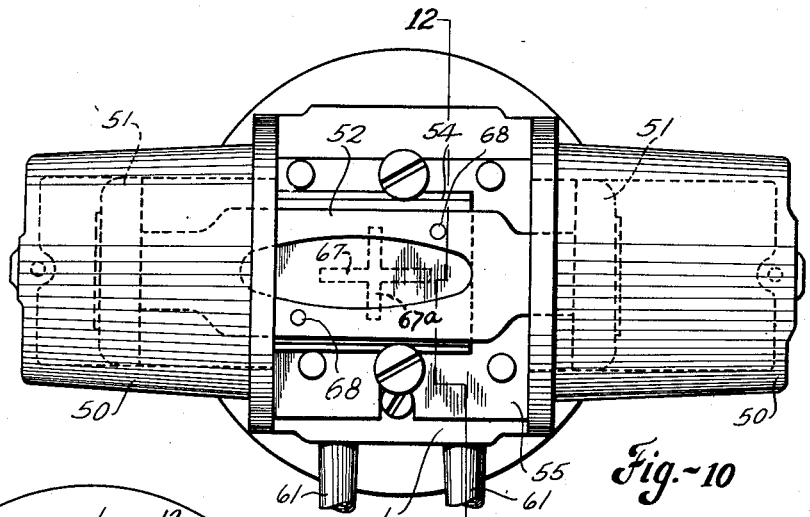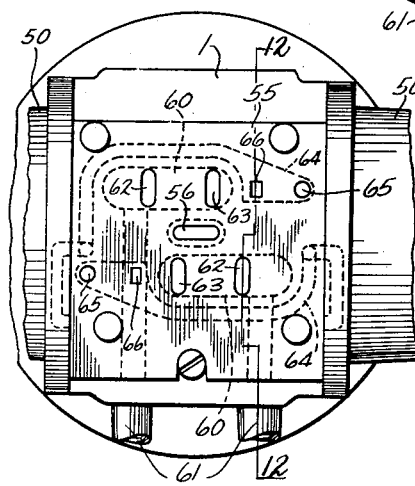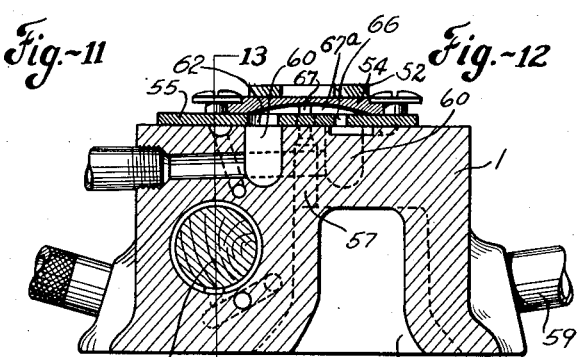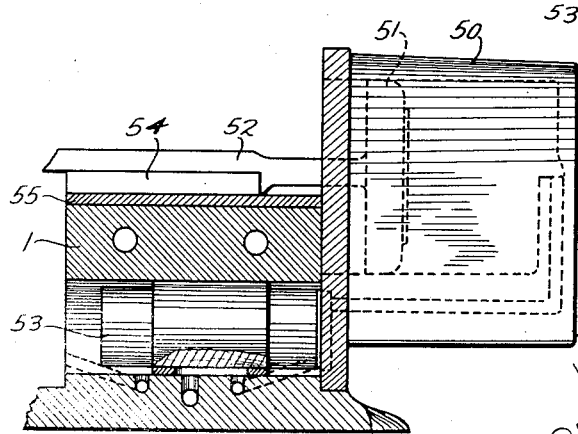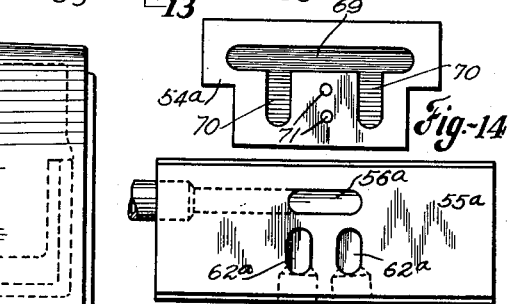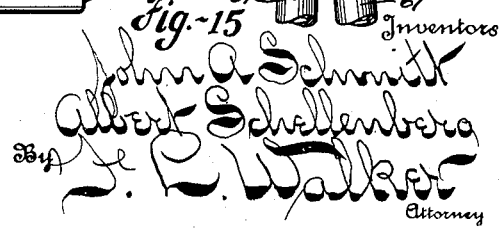

Patented Aug. 26, 1941

2,254,093

UNITED STATES PATENT OFFICE 2,254,093

PULSATOR

John A. Schmitt, Milwaukee, Wis., and Albert Schellenberg, Joliet, Ill., assignors to The Universal Milking Machine Company, Waukesha, Wis., a corporation of Wisconsin Original application March 22, 1937, Serial No. 132,228. Divided and this application November 30, 1940, Serial No. 368,074

23 Claims. (Cl. 31—62)

This invention pertains to milking apparatus and comprises a pulsator mechanism for automatically governing alternating pressure fluctuations within pneumatically controlled teat cups associated therewith, and relates more particularly to a means for mechanically simulating the action of a calf's mouth and tongue while sucking whereby there are induced successions of tremulous impulses which afford multiple massage action and a titillating effect upon the cow's teats, to thereby stimulate increased flow of milk followed by an accentuated impulse as the calf swallows the previously accumulated milk.

The present is a division of application for Letters Patent, Serial Number 132,228, filed March 22, 1937, now matured into Letters Patent.

At the present time milking machine pulsators are ordinarily operated at a rate of forty to forty-eight strokes per minute and are so timed as to open the teat cup inflation to atmosphere during substantially half the period and to subject it to suction or vacuum effect during an equal interval. Under such operations a cow does not readily nor immediately give down its milk and the machines do not milk clean but necessitates considerable hand stripping. Moreover, the use of milking machines under the usual condition causes more or less frequent congestion of the udder and teats. It is well known that hand manipulation of the udder before milking has a stimulating effect and increases the pressure within the udder and thus helps to speed the milking process.

By observation, during the suckling period it has been found that a calf manipulates the teat with its lower jaw and tongue at a quite rapid rate of from ninety to one hundred twenty impulses per minute, although it swallows very much less frequently. This rapid massage or manipulation intermediate suction withdrawal of the milk and swallow movement imparts a fluttering or quivering motion which seems to afford a nerve stimulation or excitement of the vascular system of the udder, which is pleasurable to the cow and induces a quick release of the milk. Due to this manipulative action the intermediate swallowing period is much shorter than the milking period.

The pulsator mechanism forming the subject matter hereof is adapted to simulate this natural method of milk extraction as employed by the calf by inducing multiple quick massage vibrations or quivering action of the teat cup inflation for stimulating effect between the regular expansive and contractive movement thereof. The pulsator mechanism, which as is usually the case opens the teat cup inflations or flexible linings alternately to atmosphere and to vacuum or suction, is so arranged that during each cycle of operation it opens the inflation and then for a short interval allows it to partially collapse again and again until at the end of the cycle it is again closed for the final squeeze. The inflation is thus subject to more or less constant tremulous action. This extra stimulation tends to normalize the vascular blood supply to the teats as well as stimulate the milk flow, and it has been found that it minimizes or entirely obviates blood congestion and that as soon as the apparatus is attached the cow releases her milk instantly, which has not hitherto been true of mechanical milking apparatus. The desired effect can be obtained with pulsators of different styles and with different types of valves of which slide valves, ball valves and poppet valves have all been successfully used.

The object of the invention is to improve the construction as well as the means and mode of operation of pulsator mechanisms whereby they may not only be economically manufactured, but will be more efficient in use, automatic in action, uniform in operation, having minimum number of operative parts, and unlikely to get out of repair.

A further and important object of the invention is to provide a pulsator mechanism which will produce upon the cow's teats a series of tremulous partial compressive impulses, in imitation of the manipulative action of the calf, followed by an accentuated compressive movement of greater degree in imitation of the action of the calf in swallowing the accumulated milk.

A further obpect of the invention is to provide a pulsator mechanism which will afford an undulating or tremulous impulse comprising preferably a succession of partial operations followed by a complete and final operation or impulse.

A further object of the invention is to provide an improved mechanism for stimulating the milk flow by exciting the milk glands.

A further and important object of the invention is to minimize the deleterious effect of mechanical milking apparatus upon the cow's teat and udder and to maintain normal blood circulation and prevent congestion.

A further object of the invention is to induce a quick response and cause the cow to release her milk instantly and to speed the milking operation.

A further and important object of the invention is to enable a greater quantity of milk to be extracted by the milking apparatus, thereby minimizing hand stripping operation.

A further object of the invention is to provide a pulsator mechanism affording the advantageous manipulate action and meritorious characteristics herein mentioned.

With the above primary and other incidental objects in view as will more fully appear in the specification, the invention consists of the manipulative actions, the sequence and combinations thereof and the mode of operation, or their equivalents, as hereinafter described and set forth in the claims.

Referring to the accompanying drawings, wherein is shown the preferred, but not necessarily the only form of embodiment of the invention, Fig. 1 is a perspective view of an assembled pulsator mechanism embodying the present invention.

Fig. 3 is a front elevation thereof, partly in section.

Fig. 4 is a transverse sectional view on line 4—4 of Fig. 3.

Fig. 5 is a longitudinal sectional view on line 5—5 of Fig. 4.

Fig. 6 is a detail end elevation wherein the end caps or domes and the piston diaphragm are shown in section.

Fig. 7 is a detail top plan view of the valve table showing relative location of the various ports.

Fig. 8 is a bottom plan view of the reciprocatory control valve.

Fig. 9 is a detail vertical sectional view on line 9—9 of Fig. 7.

Fig. 10 is a top plan view of a modified construction.

Fig. 11 is a detail plan view of the valve table of the embodiment illustrated in Fig. 10 showing the relative location of the ports.

Fig. 12 is a transverse sectional view on line 12—12 of Fig. 10 and Fig. 11.

Fig. 13 is a longitudinal sectional view on line 13—13 of Fig. 12.

Figs. 14 and 15 are respectively a bottom plan view of a modified form of valve and a plan view of the valve table showing the relative location of the ports of which the valve shown in Fig. 14 cooperates.

Figure 1:
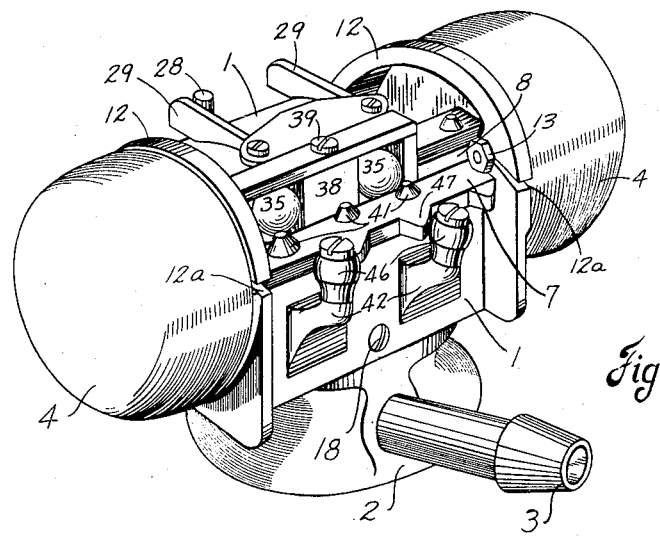
Figure 2:
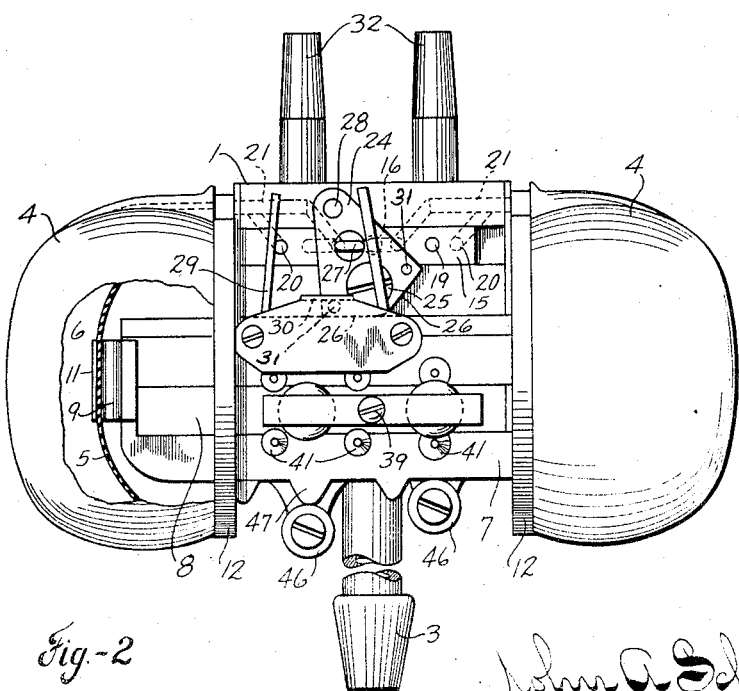
Fig. 2 is a top plan view thereof having a portion broken away.

While for illustrative purposes the present invention is herein described in its relation to a milking apparatus for which it is especially well adapted, it is to be understood however that it is not limited to such application, but may be utilized in other installations where it is desired to effect periodic fluctuations of fluid pressure. For example, the device may be employed in therapeutic treatment apparatus for circulatory disorders, where it is now common practice to subject an affected part to pulsating fluid pressure to stimulate circulation therein. The pulsating apparatus herein described is readily applicable to a wide field of fluid pressure control operation.

When employed as a part of a milking apparatus the pulsator unit forming the subject matter hereof is usually mounted on top of a milk receiver or pail within which a constant vacuum is maintained and with which the operating parts of the pulsator are in communication.

Like parts are indicated by similar characters of reference throughout the several views.

Referring to the drawings, the present pulsator includes a medial block-like body portion 1 the top of which forms a valve table, and which is superposed upon a hollow base 2 adapted for sealed communication with a vacuum chamber. Communicating with the hollow base 2 is an exhaust connection or spud 3 to which may be connected a suction conduit common to both the vacuum chamber and the pulsator mechanism mounted thereon. Located at opposite ends of the body portion 1 are terminal caps or domed heads 4 which provide piston chambers having therein flexible diaphragm type pistons 5. Intermediate the piston diaphragm 5 and the interior walls of the terminal cap or dome head 4 are variable fluid pressure chambers 6 to and from which atmospheric air is intermittently admitted and exhausted to effect to and fro fluctuating motion of the piston diaphragm 5. Disposed on top of the body block 1 for longitudinal reciprocatory motion is a slide plate 7 having therein a longitudinal slot 8. At each end the plate 7 is provided with a terminal head 9 having transverse undercut flanges forming gibbed ways 10 to receive therein flanged heads or buttons 11 carried by the piston diaphragms 5. The pistons and interconnecting plates 7 are readily detachable by relative transverse movement whereby the flanged buttons 11 may be withdrawn from beneath the overhanging flanges of the head 9. However, the piston diaphragms 5 are normally interconnected one with the other by the plates for unison alternating movement.

Each of the diaphragm pistons 5 comprises a cup-shaped flexible member of leather or other suitable material the margins of which are clamped between the side walls of the dome heads or terminal caps 4 and an internal expanding ring 12 secured to the ends of the body block 1. The rings 12 are split at 12a and are expansively adjusted by a screw bolt 13 having a tapered head and tapered nut seating in correspondingly shaped sockets 14 coincident with the split which by their camming action expand the rings 12 to clamp the margins of the diaphragm 5 and secure the terminal caps or domes 4. To effect reciprocatory movement of a plate 7 air is alternately admitted into and exhausted from the spaces or chambers 6 within the domes or terminal caps 4 beyond the diaphragm pistons 5. Such admission and exhaustion of air are controlled by the to and fro motion of a slide valve 15 mounted on top of the body block 1. Beneath the valve 15 and controlled by the to and fro motion thereof is a series of small ports including a centrally disposed port 16 from which a passage 17 leads directly through the block 1 to the hollow base 2, where it is subject to the suction or vacuum influence induced through the suction conduit connection 3.

The passage 17 is of variable capacity controlled by a regulating screw 18 to vary the rapidity of operation of the pulsator unit. Upon each side of the central suction port 16 is a pair of ports 19 and 20 both of which communicate with a passage 21 leading to the variable fluid pressure space 6 within the dome head at the corresponding end of the unit. That is to say, the ports 19 and 20 of each pair communicate with the same passage which leads to the fluid pressure space 6. The slide valve 15 is provided with two spaced recesses 22 in its underside and in spaced relation therewith two holes or ports 23 extending through the valve. The holes 23 and recesses 22 are so disposed relative to each other and to the spaced relation of the several ports in the body block 1 that when a hole 23 registers with a port 20 one of the recesses 22 will register simultaneously with the suction port 16 and the port 19 of the pair of ports pertaining to the opposite pressure chamber 6. This opens one variable fluid pressure chamber 6 within the head or dome 4 to atmosphere through the passage 21 and the port 20 and registering hole 23 of the valve. At the same time the air within the variable fluid pressure chamber 6 at the opposite end of the device is being exhausted through the corresponding passage 21 and the port 19 which is in communication through the recess 22 with the suction port 16 communicating through the passage 17 with the exhaust chamber. The simultaneous admission of air to the variable chamber 6 at one end of the apparatus and the exhaustion thereof from the corresponding chamber at the opposite end of the apparatus effects a longitudinal sliding movement of the plate 7. As the plate 7 approaches the limit of its stroke the control valve is reversed to thereby alternate the connection of the respective fluid pressure chambers 6 with atmosphere and exhaust. Thus at the end of the stroke of the reciprocatory plate 7 in either direction motion is transmitted to the control valve 15 in the opposite direction to open one of the fluid pressure chambers 6 to atmosphere through registration of the hole 23 in the valve with the corresponding port 20 and to at the same time interconnect the opposite chamber 6 with the suction port 16 through the recess 22.

To effect such reversal of movement of the slide valve 15 there is provided a swinging carrier 24 pivoted at 25 to the body block 1 and overlying the reciprocatory control valve 15. The swinging carrier has divergently beveled faces 26 at its pivotal end which abut upon a shoulder or offset in the body block to limit the swinging movement of the carrier in either direction. The swinging carrier 24 medially engages over a stud 27 carried by the reciprocatory valve 15 which projects into a hole in the carrier 24 to transmit motion from one member to the other. At its free extremity the carrier 24 has an upwardly projecting stud 28 which is alternately engaged by each of a pair of spring arms 29 yieldingly mounted upon the slide plate 7.

As the reciprocatory slide plate 7 approaches the limit of its stroke in either direction under the influences of the piston diaphragm one of the trip arms 29 carried thereby will yieldingly engage the stud 28 of the control valve carrier, and as the slide plate 7 continues to move the trip arm is placed under tension. In the meantime, the swinging valve carrier 24 is held against movement under the influence of the trip arm by a stop flange 30 on the plate 7 which projects into the path of one or the other of two studs 31 projecting from the oscillatory valve carrier 24. However, as the slide plate 7 reaches the limit of its movement the stop flange 30 will move beyond the engaged stud, whereupon the tensioned trip arm 29 engaging with the upstanding stud 28 will transmit motion to the swinging carrier 24 to shift it to its reverse position, carrying with it the reciprocatory slide valve 15.

As before mentioned, the reversal of the control valve alternates the exhaustion and admission of air from and to the respective spaces 6 in the domes or heads and correspondingly flexes the piston diaphragms and thereby transmits alternating motion to the slide plate 7.

Projecting laterally from the body block 1 is a pair of spuds or conduit connections 32 to be connected by suitable flexible conduits with conventional vibratory pneumatically controlled teat cups forming a part of the milking apparatus.

The reciprocatory movement of the slide plate 7 operates in timed sequence a series of pulsator valves which connect the respective teat cup connections 32 and the teat cups connected thereto alternately to atmosphere and to the suction effect of the vacuum chamber or receiver on which the pulsator may be mounted. The teat cup connections 32 are continuations of independent passages 33 extending horizontally through the body block 1 and communicating with vertical passages 34 which communicate at their lower ends with the hollow base 2 subjected to vacuum effect through the exhaust conduit 3. The vertical passages 34 are each controlled by two valves, herein illustrated as ball valves. These comprise upper air inlet valves 35 and lower vacuum valves 36. The latter are provided with shoulder seats 37 within the passages 34 which are counterbored for such purpose. The upper air control valves are confined in a cage-like mounting 38 removably secured to the body 1 by a screw 39. The bottom of the mounting is formed with valve seats 40 for the valves 35, above which the mounting 38 is laterally open to permit free flow of air but adapted to confine the valve balls 35 to vertical movement to and from their seats, and prevent lateral displacement thereof.

The plate 7 extends on opposite sides of the mounting 38, for the ball valves 35, which are located within the slot 8 of said plate 7.

Carried by the plate 7 contiguous to the slot 8 is a series of cam studs or buttons 41 arranged in spaced sequence which as the plate reciprocates engage beneath the ball valves and lift such valves from their seats to thereby admit air to the passages 34 and thence to the teat cups through the lateral passages 33 and conduits 32. There may be any number of such cam buttons or studs 41, which in the present instance are shown as of conical form. These cam studs are preferably of different sizes, some large and some small, to lift the valves different distances or maintain the passages open through different intervals of time. For illustrative purposes and to avoid complicating the drawings, only four pairs of such studs are illustrated. The terminal studs of the series are of larger size. As the plate 7 is shifted a series of the smaller cam studs successively engage the valve 35, lifting the valve repeatedly a slight distance off its seat, causing successive admissions of air, and finally at the limit of the stroke of the plate 7, the larger terminal cam studs engage the ball valve and lift it to greater height, thereby opening the valve to greater capacity and maintaining the valve open until initiation of the return movement of the plate 7. The lower vacuum control valves 36 are likewise controlled in timed sequence with the air valves by the movement of the plate 7.

The lower vacuum valves 36 are loosely connected with rocker arms 42 pivoted at 43 to the block 1. Each rocker arm 42 has a stem 45 extending loosely within an axial opening in the corresponding valve 36. The upper end of each arm 42 is provided with a roller 46 engaged by successive cam projections or teeth 47 upon the margin of the reciprocatory plate 7. The openings in the body block 1 in which the rocker arms are mounted are sealed by flexible diaphragms 48, tightly secured to the arms 42 and to the block 1 about such opening. Like the cam buttons or studs 41, the cam projections 47 are of different size, and may be of any desired number. As the plate 7 is shifted the rollers 46 are engaged by successive cam projections 47 to thereby rock the arms 42 and lift the vacuum control valves 36 repeatedly off their seats. The final cam projection 47 engaging the roller 46 being of larger size oscillates the rocker arm 42 through a greater degree of movement and at the limit of the stroke holds the valve 36 off its seat until initiation of the return stroke. The cam projections 47 and the cam buttons or studs 41 are arranged in longitudinally offset relation, whereby the valves 35 and 36 are alternately actuated.

When at the limit of the stroke of the plate 7 in either direction is reached the air valve 35 pertaining to one passage 34 will be held in elevated position to open the passage and teat cup connection to atmosphere while the vacuum control valve 36 pertaining to the other passage 34 will be held open by the larger cam projection 47 to connect the corresponding passage 34 and teat cup connection with the vacuum chamber within the base 2. However, intermediate the terminals of the travel of the reciprocatory plate 7 under influence of air alternately admitted to and exhausted from the spaces 6 in the heads or domes, the respective air inlet and vacuum valves 35 and 36 will be repeatedly partially operated to effect an intermittent or fluttering effect, which will be transmitted to the connected teat cups to effect the tremulous impulses followed by a full operative impulse at the end of the cycle. Such tremulous effect is transmitted to the respective teat cup connections alternately by control of the air supply and suction or vacuum control. As before described, such cycle of partial operations of the respective valves followed by a final full operation produces the desired flutter effect preparatory to the final squeeze of the teat in simulation of the mouth action of the calf.

While for illustrative purposes and convenience of description the invention has been shown and described as embodying ball type valves, it is to be understood that conventional puppet or slide valves may be subjected to successive partial and a full final operation to achieve the same result.

As illustrating an alternative form of construction there is shown in Fig. 10 a construction having at each end of the medial body block 1 a cylinder 50 having therein a reciprocatory conventional piston 51 interconnected by a relatively flat connecting bar 52 recessed on its under side to receive a flat slide valve 54. A reciprocatory piston valve 53 located in the body block 1 serves as control valve to alternately connect the respective cylinders 50 with suction and with atmosphere. The alternate admission and exhaustion of air from the respective cylinders actuates the interconnected pistons 51 to and fro and thereby shifts the slide valve 54. A perforate plate 55 on the top of the body block 1 forms a valve table having therein a series of ports communicating with passages in the body block 1.

At the center of the valve table 55 is a port 56 communicating through a vertical passage 57 with the vacuum chamber 58 subjected to exhaustion through the suction connection 59. Within the body block 1 are two chambers 60 (shown in dotted lines, Fig. 11), each communicating with a separate teat cup conduit connection 61 and each having spaced ports 62—63 in the valve table plate 55. There are also passages 64 in the body block leading to the piston valve cylinder and thence to the cylinders 50, each of which has two ports 65 and 66 corresponding to the ports 19 and 20 of the primary construction.

The slide valve 54 has in its under side transverse slots 67 and 67a (shown by dotted lines, Fig. 10) which cooperate with the various ports as the valve is reciprocated to and fro to effect alternating movement of the piston control valve 53 and thereby reversal of the pistons 51 and the slide valve 54. The longitudinal portion of the slot 67 in the under side of the valve 54 maintains its communication with the exhaust port 56 while the lateral portions of the transverse slot 67a successively communicate with the remaining ports 62, 63 and 66. The slide valve 54 has therein holes 68, one of which registers with the other of the ports 66 at the limit of its stroke in either direction. While only a minimum number of control ports have been shown it is to be understood that the number may be increased whereby the valve slot 67 will successively communicate with a succession of ports in its movement in either direction to effect the repetitious action prior to the final air admission or exhaustion of the cycle.

In Figs. 14 and 15 is illustrated a further variation of the valve recesses and coacting ports by which the desired effect may be accomplished.

In this simplified form of valve construction, as shown in Fig. 15, the valve table 55a has therein two spaced ports 62a, each communicating with one of the tube nipples 61, and a third port 56a communicating with the suction passage. The reciprocatory valve 54a shown in Fig. 14 is adapted to slide to and fro on the table 55a and has therein a substantially double tau or pi shaped recess, the longitudinal portion 69 of which has constant communication with the suction port 56a, while the branch recesses 70 register alternately with the ports 62a of the table, as shown in Fig. 15. While one branch recess 70 registers with its corresponding port 62a to connect such port and the associated conduit 61 with the suction port 56a, vent holes 71 in the valve register with the other port 62a to connect the associated conduit 61 with atmosphere. This provides an alternative valve construction of simple design.

From the above description it will be apparent that there is thus provided a device of the character described possessing the particular features of advantage before enumerated as desirable, but which obviously is susceptible of modification in its form, proportion, detail construction and arrangement of parts without departing from the principle involved or sacrificing any of its advantages.

While in order to comply with the statute, the invention has been described in language more or less specific as to the structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. In a pulsator mechanism, pulsator valve means, and fluid pressure operated means for actuating the valve means including a pair of opposing spaced cup shaped housings, cup shaped flexible diaphragms located within the housings, expansion rings interiorly of the cup shaped diaphragms between which and the interior wall of the housings the diaphragms are marginally clamped by the expansive adjustment of the rings, means for expanding the rings, a reciprocatory bar connecting the diaphragms for unison movement, and a control valve for automatically admitting and exhausting fluid under pressure to and from the housings beyond the flexible diaphragms, said pulsator valve means being operated by the to and fro motion of said reciprocatory bar.

2. In a pulsator mechanism, a pulsator valve means, fluid pressure operated means for actuating the valve means including a pair of opposing spaced housings, flexible diaphragms forming the adjacent sides of the housings, a reciprocatory bar interconnecting the diaphragms for unison movement, and capable of lateral shifting adjustment relative thereto, interlocking detachable couplings between the bar and the respective diaphragms by relative lateral adjustment of which the bar and diaphragms may be connected and disconnected, a control valve for automatically admitting and exhausting fluid under pressure to and from the housings, and an operative connection between the reciprocatory bar and the pulsator valve means.

3. In a pulsator mechanism, a pulsator valve, fluid pressure means for actuating the valve including a pair of fluid pressure chambers, pistons therein, a reciprocatory bar connecting the pistons, a movable control valve admitting and exhausting fluid under pressure to and from the pressure chambers to effect movement of the pistons and connecting bar, stop means normally holding the control valve against movement during to and fro motion of the bar and adapted to permit movement thereof only when the bar approaches the limit of its travel in either direction, a pair of independent rigid spring actuated pivoted arms alternately operatively engageable with the control valve as the bar moves in alternate directions, spring actuating means for the arms placed under tension by the movement thereof, the tensioned reaction of which operates to shift the valve when released by said stop means for movement, and an operative connection between the reciprocatory bar and the pulsator valve means.

4. In a pulsator mechanism, pulsating valve means, means for actuating the pulsating valve means including a reciprocatory bar, a succession of cam projections upon the bar having successive operative connection with the pulsating valve means during the travel movement of the bar to effect repetitious opening and closing of the pulsating valve means during the continuous movement of the bar in a single direction, and fluid pressure means for actuating the reciprocatory bar.

5. In a pulsator mechanism for inducing rhythmical fluctuations of fluid pressure, a conduit having intermittent communication with a source of fluid pressure, valve means controlling the conduit, an actuator for the valve means to repetitiously open and close the conduit during each cycle of operation to thereby effect a tremulous pulsating variation of fluid pressure in said conduit, and means for operating said actuator through a timed sequence of operations.

6. In a pulsator mechanism for inducing rhythmical fluctuations of fluid pressure, a conduit having intermittent communication with an exhaust connection, valve means controlling the conduit, an actuator for the valve means to repetitiously open and close the conduit during each cycle of operation to thereby effect a tremulous pulsating variation of fluid pressure in said conduit and means for operating said actuator through a timed sequence.

7. A pulsator for operating a teat cup of a milking apparatus in simulation of the suckling action of a calf, including a valved conduit for alternately supplying and exhausting actuating fluid to and from a fluid pressure operated teat cup, a valve for said conduit, and valve actuating means for repetitiously opening and closing the conduit during each cycle of operation to thereby induce a tremulous stimulating impulse by partial operation of the teat cup, said actuating means operating to thereafter open said conduit at the completion of the cycle of operation to effect a full operation of the teat cup.

8. A pulsator mechanism for operating a teat cup of a milking apparatus in simulation of the suckling action of a calf, including a valved conduit for alternate admission and exhaustion of actuating fluid to and from the teat cup, a valve for said conduit, and actuating means for the valve for partially opening and thereafter closing the conduit during each cycle of operation to effect a stimulating impulse by partial operation of the teat cup and thereafter fully opening said conduit at the end of the cycle of operation to enable maximum operation of the teat cup.

9. A pulsator mechanism for inducing rhythmical pulsations of fluid pressure, including air supply and exhaust connections, valve means for effecting alternate admission and exhaustion of air, and means for effecting a flutter action of said valve means.

10. A pulsator mechanism for inducing rhythmical pulsations of fluid pressure including a fluid pressure supply and exhaust conduit, valve means for alternately connecting such conduit with a source of fluid under pressure and with suction, and means for automatically inducing a flutter action of said valve means.

11. A pulsator mechanism for inducing rhythmical pulsations of fluid pressure including a fluid pressure supply and exhaust conduit to be alternately connected with a source of fluid under pressure and with suction and a periodically operated valve means for repetitiously connecting the conduit with the fluid pressure supply during each periodic operation alternately with its connection with suction.

12. A pulsator mechanism for inducing rhythmical pulsations of fluid pressure including a fluid pressure supply and exhaust conduit to be alternately connected with a source of fluid under pressure and with suction and a periodically operated valve means for repetitiously connecting the conduit with suction during each operative period alternately with its connection with the fluid pressure supply.

13. In a pulsator mechanism, a pulsating valve means for alternately connecting a supply and exhaust conduit with a source of fluid pressure and with an exhaust outlet and fluid pressure means for actuating the valve including a pair of spaced fluid pressure chambers arranged in opposing spaced relation, flexible diaphragms forming a variable side of each chamber, a reciprocatory bar connecting the diaphragms one with the other for unison movements, and a control valve for alternately connecting the respective pressure chambers with the source of fluid pressure and with the exhaust outlet, said pulsating valve means being repetitiously actuated during each to and fro movement of said connecting bar.

14. A pulsator mechanism for controlling fluid pressure fluctuations of an associated apparatus, embodying valve means and fluid pressure operated means for operating the valve means characterized by means for effecting a pulsating action of varying intensity including a preliminary partial operation of the valve followed by a reversal thereof and thereafter a further operation thereof of increased degree.

15. A pulsator mechanism for effecting rhythmical fluctuations of fluid pressure, including a fluid pressure control valve characterized by means for actuating the valve through a cycle of movements of different degree in predetermined sequence.

16. A pulsator mechanism for effecting rhythmical fluctuations of fluid pressure, including an intermittently operated control valve and actuating means for imparting thereto a succession of substantially uniform movements and a final movement of greater degree in repetitious cycles.

17. A pulsator mechanism for a milking apparatus whereby associated fluid pressure operated teat cup units are subjected to alternating periods of exhaustion and inflation, including fluid pressure control means for periodically reversing the effect of fluid pressure upon the teat cup units, characterized by a governor therefor for momentarily interrupting the continuity of the respective exhaustion and inflation periods, the construction and arrangement being such that a sustained tremulous pulsating effect is transmitted to the teat cups during each succeeding period of exhaustion and inflation.

18. A pulsator mechanism for a milking apparatus whereby associated fluid pressure operated teat cup units are subjected to alternating periods of exhaustion and inflation, including fluid pressure control means for periodically reversing the effect of fluid pressure upon the teat cup units, characterized by actuating means for said fluid pressure control means operative to repetitiously interrupt the exhaustion period by partial reversal of the fluid pressure control means and effect full reversal thereof at the completion of said period, the construction and arrangement being such as to transmit to the teat cups a tremulous pulsating effect.

19. A pulsator mechanism for a milking apparatus whereby associated fluid pressure operated teat cup units are subjected to alternating periods of exhaustion and inflation, including fluid pressure control means for periodically reversing the effect of fluid pressure upon the teat cup units, characterized by actuating means for said fluid pressure control means operative to repetitiously interrupt the inflation period by partial reversal of the fluid pressure control means and effect full reversal thereof at the completion of said period, the construction and arrangement being such as to transmit to the teat cups a tremulous pulsating effect.

20. A pulsator mechanism for a milking apparatus whereby associated fluid pressure operated teat cup units are subjected to alternating periods of exhaustion and inflation, including fluid pressure control means for periodically reversing the effect of fluid pressure upon the teat cup units, characterized by actuating means for the fluid pressure control means operative to repetitiously interrupt a given period of operation of the teat cups by fluctuation of the fluid pressure control means, to transmit successive pulsations to the teat cups and for accenting at least one of the pulsations by increased degree of actuation of the fluid pressure control means, the construction and arrangement being such as to transmit to the teat cups a succession of like impulses but of uniform intensity.

21. A pulsator mechanism for a milking apparatus whereby associated fluid pressure operated teat cups are subjected to alternating periods of exhaustion and inflation, including fluid pressure control means for periodically reversing the effect of fluid pressure upon the teat cups, characterized by governing means operative to fluctuate the fluid pressure influence upon teat cups without reversal thereof, the construction and arrangement being such as to transmit to the teat cups continuing vibratory impulses of like character during a given period.

22. A pulsator mechanism for a milking apparatus whereby associated fluid pressure operated teat cups are subjected to alternating periods of exhaustion and inflation, including fluid pressure control means for periodically reversing the effect of fluid pressure upon the teat cups, characterized by governing means operative to repetitiously fluctuate the fluid pressure influence upon the teat cups without reversal thereof to transmit to the teat cups a succession of vibratory impulses of like character, said governing means being so constructed and arranged as to accent at least one of the vibratory impulses during each succession.

23. A pulsator mechanism for a milking apparatus whereby associated fluid pressure operated teat cups are subjected to alternating periods of exhaustion and inflation, including fluid pressure control means for periodically reversing the effect of fluid pressure upon the teat cups, characterized by governing means for repetitiously fluctuating the effect of the fluid pressure upon the teat cups during each period of reversal thereof, said governing means being constructed and arranged to transmit to the teat cups multiple like fluid pressure impulses intermediate succeeding reversals of fluid pressure effect.

JOHN A. SCHMITT.
ALBERT SCHELLENBERG.

CERTIFICATE OF CORRECTION.

Patent No. 2,254,093. August 26, 1941.

JOHN A. SCHMITT, ET AL.

It is hereby certified that error appears in the printed specification of the above numbered patent requiring correction as follows: Page 2, first column, line 7, for the word "manipulate" read --manipulative--; lines 11 and 12, for "manipulative actions, the sequence" read --features of construction, the parts--; page 3, first column, line 55, for "influences" read --influence--; and that the said Letters Patent should be read with this correction therein that the same may conform to the record of the case in the Patent Office.

Signed and sealed this 21st day of October, A. D. 1941.

(Seal)

Henry Van Arsdale,
Acting Commissioner of Patents.